US012271155B2

(12) United States Patent
Marquis Weible et al.

(10) Patent No.: US 12,271,155 B2
(45) Date of Patent: Apr. 8, 2025

(54) MICROMECHANICAL COMPONENT FOR CONTAINING A LUBRICANT SUBSTANCE

(71) Applicant: Association suisse pour la recherche horlogère, Neuchâtel (CH)

(72) Inventors: Fabienne Marquis Weible, Neuchâtel (CH); Evelyne Vallat, Chézard-St-Martin (CH)

(73) Assignee: ASSOCIATION SUISSE POUR LA RECHERCHE HORLOGERE, Neuchâtel (CH)

(*) Notice: Subject to any disclaimer, the term of this patent is extended or adjusted under 35 U.S.C. 154(b) by 425 days.

(21) Appl. No.: 17/624,172

(22) PCT Filed: Mar. 27, 2020

(86) PCT No.: PCT/IB2020/052901
§ 371 (c)(1),
(2) Date: Dec. 30, 2021

(87) PCT Pub. No.: WO2021/005423
PCT Pub. Date: Jan. 14, 2021

(65) Prior Publication Data

US 2022/0357706 A1 Nov. 10, 2022

(30) Foreign Application Priority Data

Jul. 5, 2019 (EP) .................................... 19184822

(51) Int. Cl.
*G04B 31/08* (2006.01)
*G04B 31/008* (2006.01)

(52) U.S. Cl.
CPC .......... *G04B 31/08* (2013.01); *G04B 31/008* (2013.01)

(58) Field of Classification Search
None
See application file for complete search history.

(56) References Cited

U.S. PATENT DOCUMENTS

2015/0103639 A1* 4/2015 Portet .................. C10M 105/74 368/286
2017/0038127 A1* 2/2017 Sikka ...................... C03C 15/00
(Continued)

FOREIGN PATENT DOCUMENTS

CH 713426 A2 8/2018
EP 3002637 A1 4/2016
(Continued)

OTHER PUBLICATIONS

Translation of EP 3002637, Espacenet (Year: 2024).*
(Continued)

*Primary Examiner* — Renee S Luebke
*Assistant Examiner* — Matthew Daniel Hwang
(74) *Attorney, Agent, or Firm* — BLANK ROME LLP

(57) ABSTRACT

Micromechanical component intended for clock mechanisms. At least one portion of the component includes a crystalline mineral material with a carbon or alumina basis and at least one contact surface is intended to be brought into sliding and/or pivoting contact. The contact surface locally has at least one microstructured area with a three-dimensional texture. The three-dimensional texture is formed of microcavities, making the microstructured area more oleophobic than the non-microstructured contact surface, and/or formed of micro pillars making the microstructured area more oleophilic than the non-microstructured contact surface. The microstructured area is configured to locally confine a lubricant substance to a lubricated portion of the contact surface.

12 Claims, 5 Drawing Sheets

(56) References Cited

U.S. PATENT DOCUMENTS

| | | | |
|---|---|---|---|
| 2017/0068219 | A1 | 3/2017 | Dubois |
| 2018/0231938 | A1 | 8/2018 | Nakamura et al. |

FOREIGN PATENT DOCUMENTS

| | | | |
|---|---|---|---|
| EP | 3067757 | A1 | 9/2016 |
| EP | 3141520 | A1 | 3/2017 |
| JP | 2018/155461 | A | 10/2018 |
| WO | WO-2014/012039 | A1 | 1/2014 |

OTHER PUBLICATIONS

Translation of EP 3067757, Espacenet (Year: 2024).*
International Search Report for PCT/IB2020/052901, dated Jul. 1, 2020, 2 pages.

* cited by examiner

MICROMECHANICAL COMPONENT FOR CONTAINING A LUBRICANT SUBSTANCE

RELATED APPLICATIONS

This application is a national phase of PCT/IB2020/052901, filed on Mar. 27, 2020, which claims the benefit of European Patent Application No. EP19184822.5, filed on Jul. 5, 2019. The entire contents of these applications are hereby incorporated by reference.

TECHNICAL FIELD

The present invention relates to a micromechanical component intended for timepiece mechanisms, in particular a component that needs to be lubricated.

PRIOR ART

It is known that, in timepiece mechanisms, there are many moving parts that are in frictional contact with one another. This friction needs to be as low as possible since it can have a negative effect on the precision and/or the autonomy of the mechanism. To reduce this friction, it is therefore known to use a liquid or viscous lubricant. This lubricant is used sparingly on well-defined zones and in suitable quantities.

However, this lubricant may escape from the zone in which it has been deposited. In particular, in the natural chemical state of the surfaces resulting from exposure to ambient conditions, the movement of the parts tends to displace the lubricant from the contact zone to a zone that is not subject to friction. Moreover, on a mechanical component of small size, such as a timepiece component, it is difficult to form a lubricant film only in a specific region.

In order that the part intended to slide retains the lubricant so as to reduce the wear on account of the friction caused by sliding during rotation or the like, it is conventional to chemically treat the surface. The chemical state of the surface is obtained by different types of cleaning processes, optionally followed by the coating of the part with a film of nanometric thickness, comprising a fluorinated active agent. Different fluorinated active agents are known in the timepiece sector under the designation epilame. The coating of the components with this type of product, outside the contact zone, makes it possible to retain the lubricant in the contact zone by virtue of the reduction in the surface energy of the treated part.

However, the capacity of the mechanical component to retain the lubricant long-term after a surface treatment and/or the addition of a controlled chemical film can be improved, with the objective of reducing the wear undergone by the mechanical component on account of a deficiency of lubricating oil.

The document CH713426 describes a first mechanical component having a first surface zone, a second component having a second surface zone over which the first surface zone can slide. An oil-retaining film is formed on at least one receiving zone chosen from the first and second surface zones, this oil-retaining film being more oleophilic than the receiving zone. The oil-retaining film is a chemical compound comprising one of the elements Si, Ti and Zr, and a hydrocarbon radical.

The document EP3002637 describes a timepiece system comprising a first component with at least one first functional zone that comes into frictional contact with at least one second functional zone of a second component during the operation of the timepiece system; wherein at least one of the first functional zone and the second functional zone has controlled structuring on the submicron scale.

SUMMARY OF THE INVENTION

The present disclosure relates to a micromechanical component intended for timepiece mechanisms, at least a part of the component being made from a crystalline mineral material based on carbon or alumina comprising at least one contact surface intended to come into sliding and/or pivoting contact; the contact surface locally comprising at least one microstructured zone having a three-dimensional texture; the three-dimensional texture being formed of microcavities that make the microstructured zone more oleophobic than the non-microstructured contact surface, and/or formed of micropillars that make the microstructured zone more oleophilic than the non-microstructured contact surface; the microstructured zone being configured to locally confine a lubricating substance on a lubricated portion r of the contact surface. The microstructured zone is configured according to one of the following alternatives: the texture is formed of microcavities and the microstructured zone extends at the periphery of the lubricated portion; or the microstructured zone comprises a first microstructured zone comprising a texture formed of microcavities and extending at the periphery of the lubricated portion, and a second microstructured zone comprising a texture formed of micropillars and extending in the lubricated portion.

The component described here improves the confinement of the lubricating substance in a portion of the contact surface. Depending on the configuration of the microstructured zone, different arrangements of oleophilic and oleophobic zones can be provided in the vicinity of or on the contact surface. The microstructured zone therefore makes it possible to control the spatial location of the lubricating substance in a portion of the contact surface depending on the different applications of lubrication. The component described here can also improve the supply of lubricating substance into the portion of the contact surface.

BRIEF DESCRIPTION OF THE FIGURES

Implementation examples of the invention are indicated in the description illustrated by the appended figures, in which.

EXEMPLARY EMBODIMENT(S)

Figure 1:
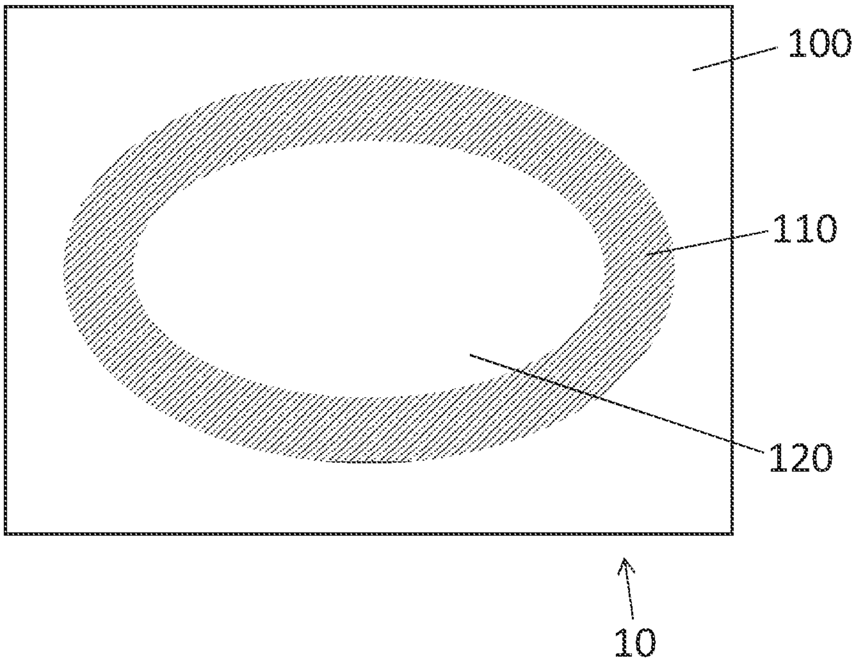
FIG. 1 schematically shows a micromechanical component having a contact surface having a microstructured zone, according to one embodiment.

FIG. 1 schematically shows a micromechanical component 10 intended for timepiece mechanisms, according to one embodiment. The component 10 comprises at least one contact surface 100, at least one portion of the contact surface 100 being intended to come into sliding and/or pivoting contact, for example with another component of a timepiece mechanism.

The component 10 is manufactured entirely or made in part from a crystalline mineral material based on carbon or alumina ($Al_2O_3$). Preferably, the crystalline mineral material is ruby, sapphire or diamond, natural or synthetic. Other materials are also conceivable, such as polymers, metals or metal alloys, ceramics, silica, glass, silicon, etc.

The component 10, manufactured entirely or made in part from a crystalline mineral material, has a contact surface 100 locally comprising at least one microstructured zone 110. The microstructured zone 110 may be rendered more oleophobic than the non-microstructured contact surface 100. Alternatively, the microstructured zone 110 can be rendered more oleophilic than the non-microstructured contact surface 100.

Figure 2:
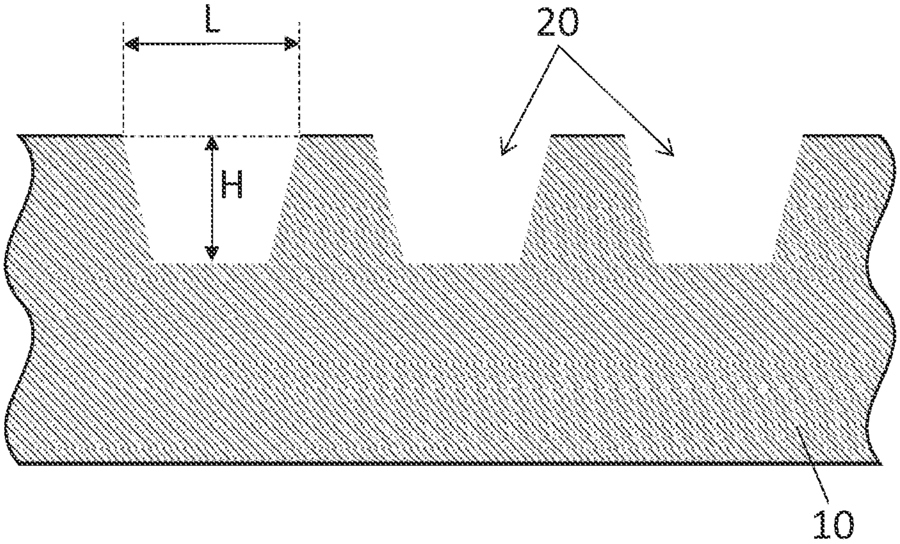
FIG. 2 illustrates the microstructured zone having a three-dimensional texture formed of microcavities, according to one embodiment.

According to one embodiment illustrated in FIG. 2, the microstructured zone 110 has a three-dimensional texture formed of microcavities 20. The microcavities 20 typically have a substantially frustoconical shape narrowing toward the bottom of the cavity 20. The lateral dimension L of the microcavity 20 at the surface is between 5 μm and 150 μm and preferably between 10 μm and 60 μm. The ratio of the height H to the lateral dimension L of the microcavity 20 is between 0.01 and 1. The microcavities 20 are non-communicating, meaning that the cavities 20 do not communicate fluidically with one another.

Figure 3:
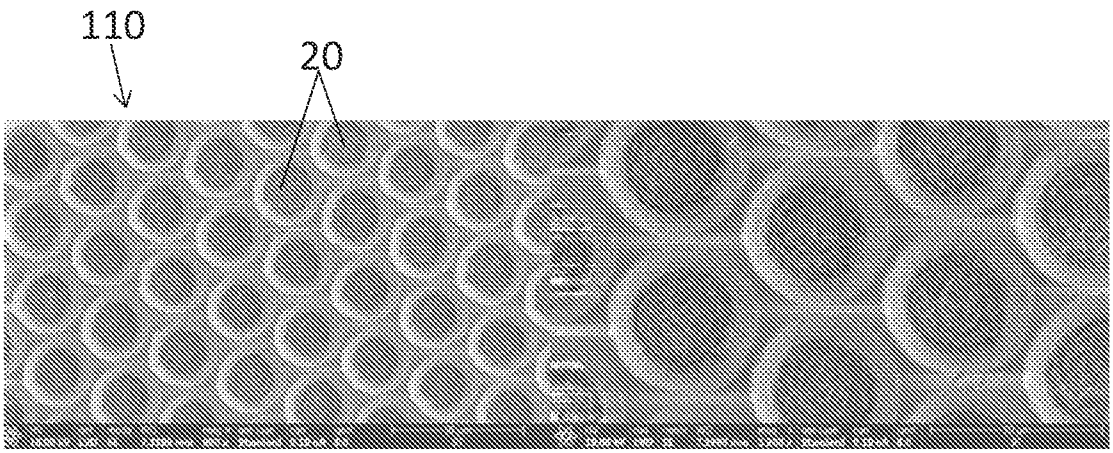
FIG. 3 shows an SEM micrograph of the texture comprising microcavities.

FIG. 3 shows a micrograph (for two magnifications) of a three-dimensional texture comprising microcavities 20 formed in a monocrystalline pellet of traditional timepiece ruby (Verneuil ruby $Al_2O_3Cr$, cleaved, cut and polished), The microcavities have a lateral dimension L of around 25 μm.

Figure 4:
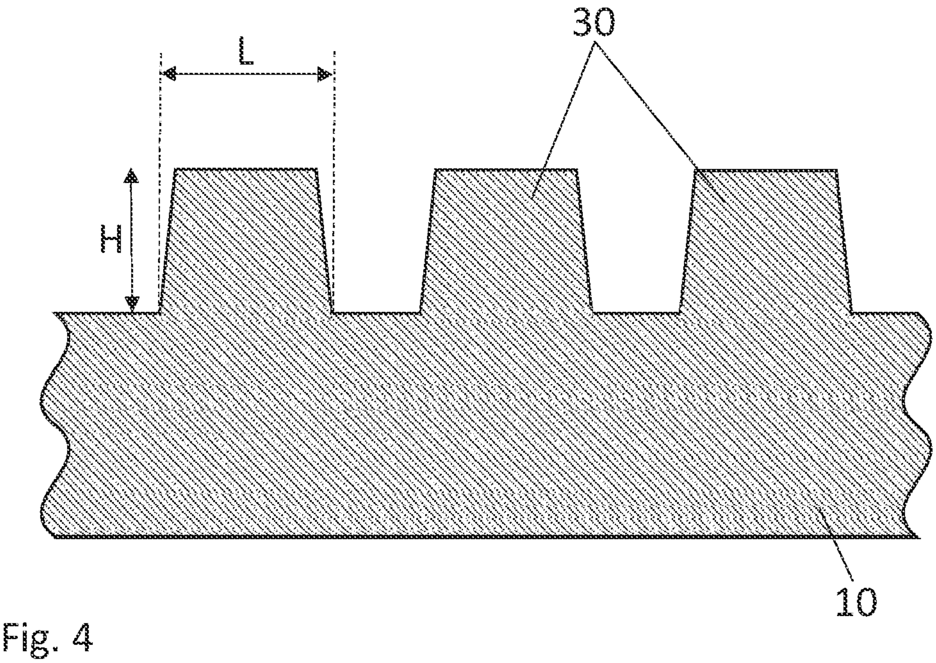
FIG. 4 illustrates the microstructured zone having a three-dimensional texture formed of micropillars according to one embodiment.

According to another embodiment illustrated in FIG. 4, the microstructured zone 110 has a three-dimensional texture formed of micropillars 30. The micropillars 30 typically have a substantially frustoconical shape that narrows toward the top of the micropillar 30. The lateral dimension L of the micropillar 30 at its base is between 5 μm and 150 μm and preferably between 10 μm and 60 μm. The ratio of the height H to the lateral dimension L of the micropillar 30 is between 0.01 and 1.

The lateral dimension L of the microcavities 20 and of the micropillars 30 of between 10 μm and 60 μm is more favorable for timepiece applications, given the dimensions of the timepiece components that come into contact.

Figure 5:
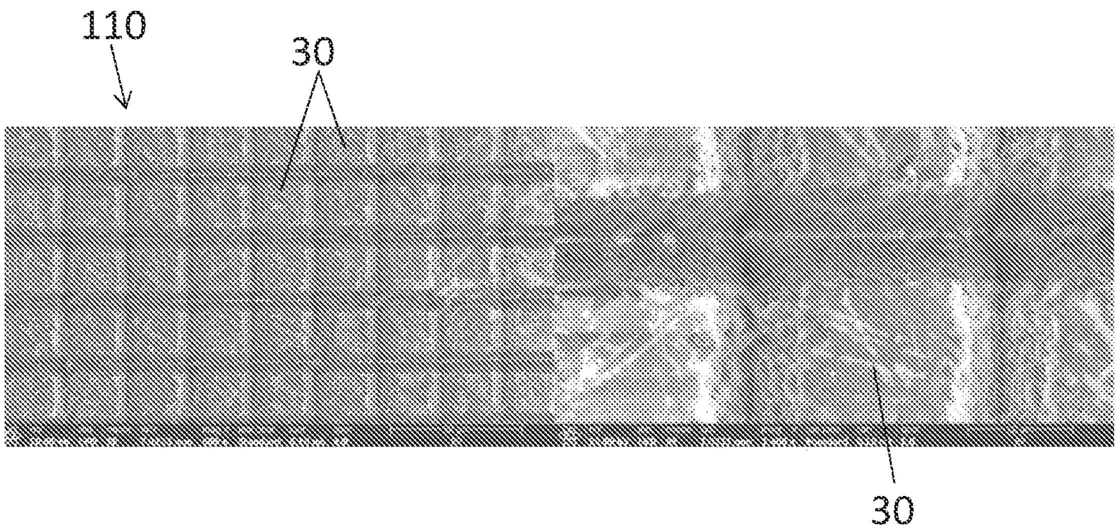
FIG. 5 shows an SEM micrograph of the texture comprising micropillars.

FIG. 5 shows an SEM micrograph (for two magnifications) of a three-dimensional texture comprising micropillars 20 formed in the same monocrystalline pellet of ruby as in FIG. 3. The micropillars 30 have a lateral dimension L of around 25 μm.

Figure 6:
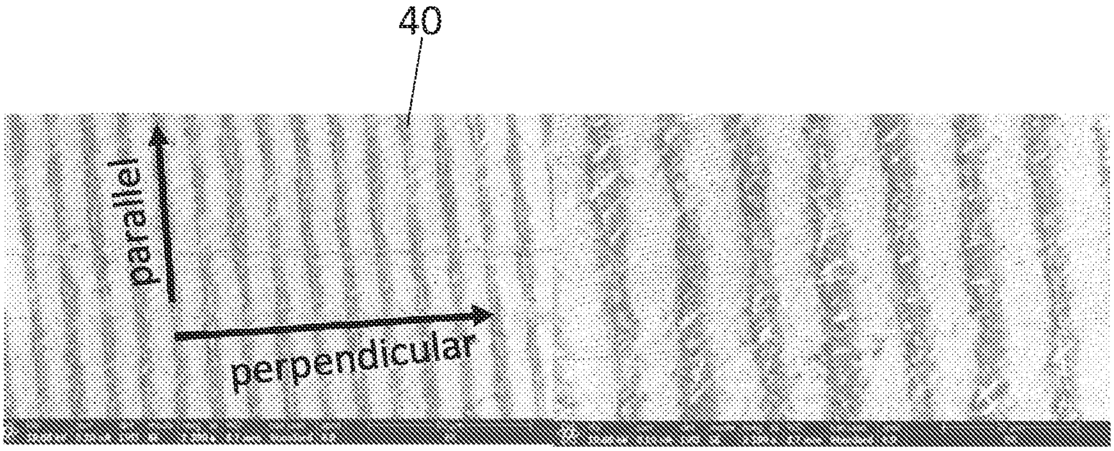
FIG. 6 shows an SEM micrograph of an undulating microstructure, according to one embodiment.

According to yet another embodiment, the microstructured zone 110 comprises an undulating microstructure 40. FIG. 6 shows an SEM micrograph of the undulating microstructure 40 formed in the same monocrystalline pellet of ruby as in FIG. 3. The undulating microstructure 40 typically has a dual texture made up of parallel furrows with a width of typically between 7 and 12 μm and a depth less than 1 μm (typically 0.2 to 0.9 μm). Along a furrow, the depth is modulated by an oscillation with a micrometer period (typically 1 μm) and an amplitude less than 0.2 μm.

Figure 7:
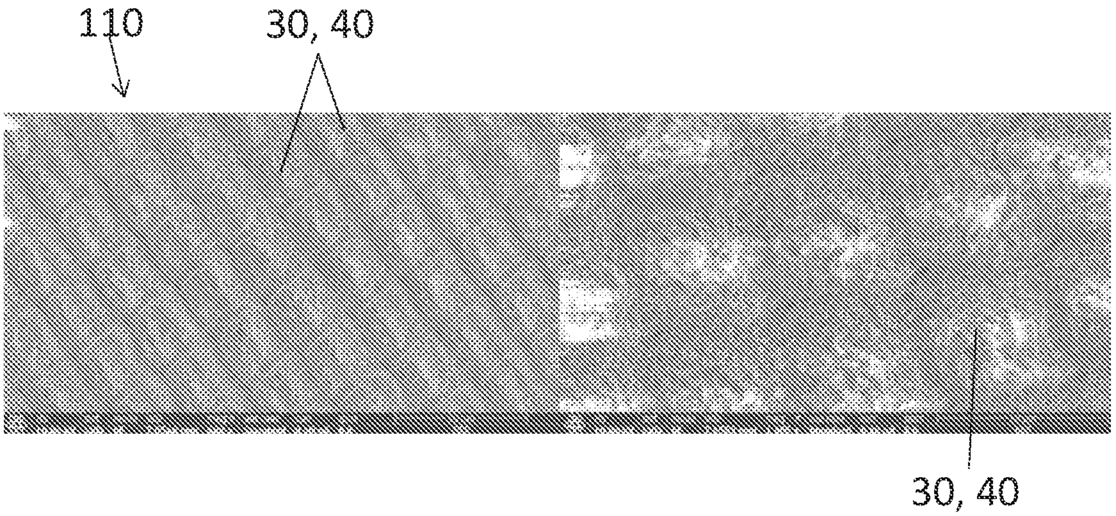
FIG. 7 shows an SEM micrograph of a texture formed of micropillars on which the undulating microstructure is superimposed.

According to yet another embodiment, the microstructured zone 110 comprises the texture formed of micropillars 30 on which the undulating microstructure 40 is superimposed. FIG. 7 shows an SEM micrograph of such a texture made in the same monocrystalline pellet of ruby as in FIG. 3.

The texture of microcavities 20 and micropillars 30 may be arranged in a regular pattern, for example a hexagonal or square pattern, or in an irregular pattern. The density of the microcavities 20 or micropillars 30 in the microstructured zone 110 may be between 0.1 and 0.9, preferably between 0.4 and 0.8.

In these embodiments, the textures, comprising the undulating microstructure, the microcavities 20, the micropillars 30 and the micropillars 30 with the superimposed undulating microstructure, have been made with the aid of a femtosecond laser. Other methods for manufacturing the textures are conceivable, however, such as micromanufacturing, mechanical machining, diamond wire or the like.

Figure 8:
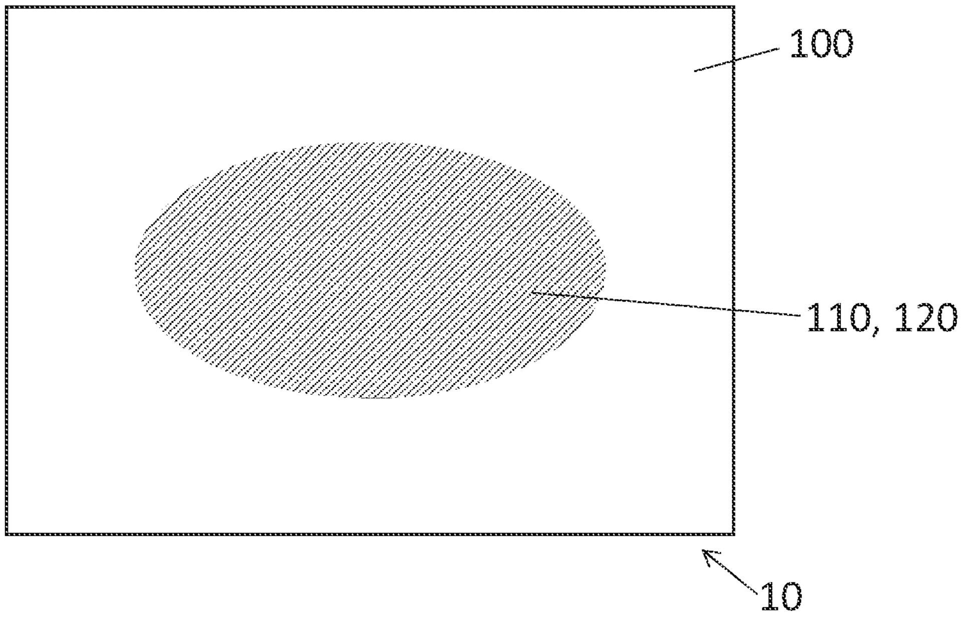
FIG. 8 schematically shows the component having a contact surface having a microstructured zone, according to another embodiment.

The wettability and the more or less oleophilic or oleophobic nature of the contact surface 100 with respect to a liquid were evaluated by a measurement of the contact angle in dynamic captured images during the advancement ($\theta_{CA}$) of a drop of liquid injected continuously via a microcannula above the contact surface 100 in the absence of the microstructured zone 110 and above the contact surface 100 comprising the microstructured zone 110, for example as shown in FIG. 8. In particular, the measurement of the contact angle $\theta_{CA}$ was carried out with the timepiece oil Synth-A-lube 9010 manufactured by the Moebius division of The Swatch Group Research and Development Ltd. The crystalline mineral material is ruby, The measurements of the contact angle were taken on the contact surface 100 in the natural state (without preparation), and after chemical treatment involving, in this embodiment, a combination of solvent cleaning following by an oxygen plasma treatment. This preparation makes it possible to reduce the contamination of the surface with carbon to a threshold less than 10% at. In the natural state (contamination with carbon greater than 10% at.), for all the samples tested, the contact angles are less than 300.

The measurements of the contact angle were taken on the contact surface 100 that has been prepared as above, followed by an epilame-coating treatment. During the epilame-coating treatment, the contact surface 100 is covered with a very thin film of fluorinated polymer. In particular, the epilame-coating treatment is carried out with the standard timepiece product Fixodrop® from Moebius.

Table 1 reports the contact angles $\theta_{CA}$ measured on the non-microstructured contact surface 100 and on the contact surface 100 having a microstructured zone 110 having a texture formed of microcavities 20, formed of micropillars 30 and formed only of the undulating microstructure. The contact angles $\theta_{CA}$ were also measured on the contact surface 100 having a texture formed of micropillars 30 on which the undulating microstructure is superimposed. The measurements were taken on textures having the following dimensions: microcavities 20 having a lateral dimension L of 25.6±0.6 μm and a depth of 13.8±0.2 micropillars 30 having a lateral dimension L of 15±1 μm and a height of 8 to 9 μm, and an undulating microstructure having a trough-peak height of 6±0.5 μm and with a spacing between the peaks of 0.2 to 0.9 μm. The microcavities 20 are arranged in a hexagonal pattern and the micropillars are arranged in a square pattern. The undulating microstructure is arranged in bands with a periodicity of 10 μm.

TABLE 1

| Texture | Surface state | $\theta_{CA}$ |
|---|---|---|
| non-microstructured | plasma | 29 |
| | epilame-coated | 57 |
| microcavities | plasma | 62 |
| | epilame-coated | 125 |
| micropillars | plasma | 21 |
| micropillars with undulating microstructure | plasma | 19 |
| undulating microstructure | plasma | 30 |

Table 1 shows that the texture formed of microcavities 20 makes it possible to obtain a contact angle $\theta_{CA}$ during the advancement of about 62°, which is much larger than that measured on the non-microstructured contact surface 100 ($\theta_{CA}$≈29°). The contact angle $\theta_{CA}$ measured during the advancement for the texture formed of microcavities 20 is similar to the one measured ($\theta_{CA}$≈57°) for the non-microstructured contact surface 100 comprising a film of epilame (epilame-coated). The texture formed of microcavities 20 comprising the film of epilame makes it possible to obtain a contact angle $\theta_{CA}$ of around 125°, or double the angle measured in the absence of the film of epilame. The oleophobic nature of the texture formed of microcavities 20 comprising the film of epilame is particularly noteworthy. In the presence of the film of epilame, the drop of oil demonstrates pinning effects and as soon as the drop of oil leaves the textured surface, it tends to roll and to stick to the non-microstructured surface adjacent to the microstructured zone 110.

The texture formed of micropillars 30 results in a contact angle $\theta_{CA}$ of around 21°, and therefore much smaller than those obtained for the texture formed of microcavities 20. The texture formed of micropillars 30 comprising the superimposed undulating microstructure results in a contact angle $\theta_{CA}$ of around 19°, which is likewise much smaller than those obtained for the texture formed of microcavities 20. The texture formed of micropillars 30 with or without a superimposed undulating microstructure is more oleophilic than the non-microstructured contact surface 100.

For the microstructured zone 110 comprising only the undulating microstructure, a contact angle $\theta_{CA}$ of around 300 is measured. The undulating microstructure has only a very small influence on the contact angle and therefore the oleophilic/oleophobic nature of the contact surface 100.

The microstructured zone 110 therefore makes it possible to influence the wettability with a timepiece oil. In particular, the texture formed of micropillars 30 makes it possible to render the surface more oleophilic than the non-microstructured contact surface 100 and the texture formed of microcavities 20 makes it possible to render the surface more oleophobic than the non-microstructured contact surface 100.

According to one embodiment, the microstructured zone 110 has a film of a substance for modifying the surface energy. The film may comprise a film of nanometric thickness, comprising a fluorinated active agent. The film may comprise a film of epilame. The addition of such a film to the microstructured zone 110 comprising the texture formed of microcavities 20 makes it possible to further increase the oleophobic nature of the microstructured zone 110 by way of a cumulative effect.

According to one embodiment, the contact surface 100 comprising the microstructured zone 110 may undergo an oxygen plasma treatment, possibly after solvent cleaning. Such an oxygen plasma treatment increases the oleophobic nature of the microstructured zone 110 comprising the texture formed of microcavities 20 and increases the oleophilic nature of the microstructured zone 110 comprising the texture formed of micropillars 30.

The observations above apply for microcavities 20 or micropillars 30 having a lateral dimension L of between 5 μm and 150 μm, and for microcavities 20 or micropillars 30 in which the radio of the height H to the lateral dimension L of the microcavity 20 is between 0.01 and 1.

The observations above also apply for a density of the microcavities 20 or the micropillars 30 in the microstructured zone 110, comprising microcavities 20 or micropillars 30, of between 0.1 and 0.9.

Referring again to FIG. 1, the contact surface 100 comprises a lubricated portion 120, meaning a portion of the contact surface 100 intended to receive a lubricating substance (for example a timepiece oil or the like). The lubricated portion 120 may correspond to said at least one portion of the contact surface 100 that is intended to come into sliding and/or pivoting contact. The microstructured zone 110 extends at the periphery of the lubricated portion 120. When the microstructured zone 110 is more oleophobic than the lubricated portion 120, the microstructured zone 110 will confine the lubricating substance in the lubricated portion 120. To this end, the microstructured zone 110 may comprise the texture formed of microcavities 20. The lubricated portion 120 of the contact surface 100 is non-microstructured and therefore more oleophilic than the microstructured zone 110.

According to an alternative embodiment shown in FIG. 8, the microstructured zone 110 extends in the lubricated portion 120 and the rest of the contact surface 100 is non-microstructured. In this case, the microstructured zone 110 is rendered more oleophilic than the rest of the contact surface 100 by comprising the texture formed of micropillars 30, or possibly micropillars 30 comprising the superimposed undulating microstructure.

Figure 9:
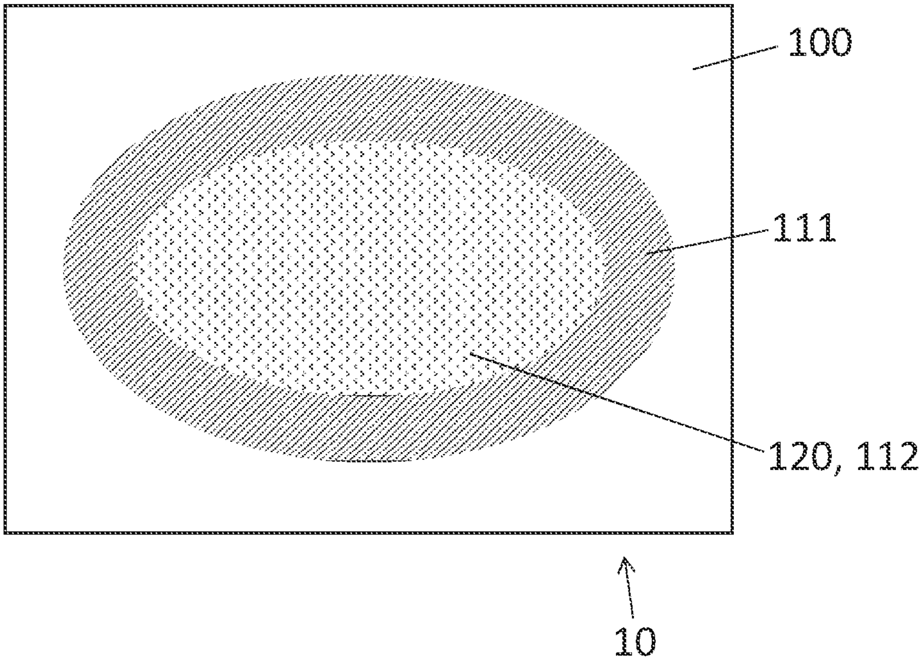
FIG. 9 schematically shows the component having a contact surface having a first microstructured zone and a second microstructured zone, according to one embodiment.

According to yet another embodiment shown in FIG. 9, the contact surface 100 comprises a first microstructured zone 111 extending at the periphery of the lubricated portion 120 and a second microstructured zone 112 extending in the lubricated portion 120. In such a configuration, the first microstructured zone 111 is preferably more oleophobic than the second microstructured zone 112 so as to confine the lubricating substance in the lubricated portion 120.

For example, the first microstructured zone 111 may have a texture formed of microcavities 20 and the second microstructured zone 112 may have a texture formed of micropillars 30. An advantage of this configuration is that the oleophilic nature of the second microstructured zone 112 already retains the lubricating substance in the lubricated portion 120, this confinement being reinforced by the first, oleophobic microstructured zone 111 at the periphery of the lubricated portion 120.

The microstructured zone 111, which may comprise the first microstructured zone 111, may extend over all the rest of the contact surface 100, that is to say all of the contact surface 100 outside the lubricated portion 120.

Other arrangements of the microstructured zone 110, including of the first and second microstructured zones 111, 112, are also possible such that the microstructured zone 110 extends over a portion of the contact surface 100 or over the entire contact surface 100.

The cavities 20 of the texture formed of microcavities 20 may also act as reservoirs for the lubricating substance. The lubricating substance can then be trapped in the microcavities 20. In this case, the microcavities 20 supply lubricant to the contact surface 100.

Other spatial combinations of the microstructured zone 110 on the contact surface 100 are also possible so as to obtain arrangements of zones that are more or less oleophobic and/or oleophilic on the contact surface 100. The different spatial combinations of the microstructured zone 110 can be combined with a film of a substance for modifying the surface energy and/or an oxygen plasma treatment in order to modify the oleophobic and/or oleophilic nature of the microstructured zone 110. It is thus possible to optimize the confinement of the lubricating substance in the vicinity of and/or in the lubricated portion 120 in order to ensure that the lubricant is located long-term in this zone.

Figure 10:
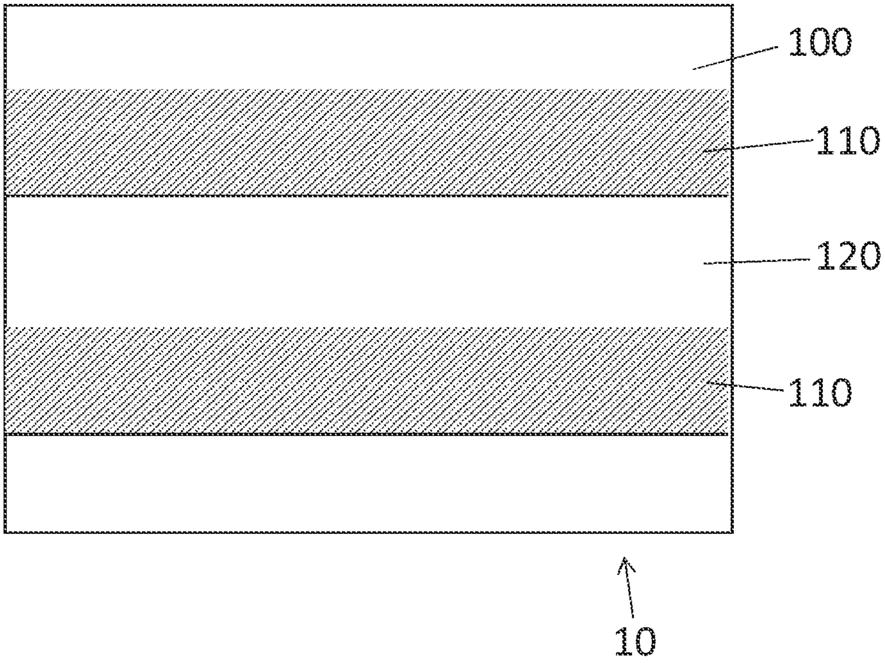
FIG. 10 schematically shows the component having a contact surface with a microstructured zone in the vicinity of the contact zone, according to one embodiment.

FIG. 10 schematically shows the component according to another embodiment, in which the contact surface 100 has two microstructured zones 110 in the form of bands bordering the lubricated portion 120 between the two microstructured zones 110. Such an arrangement can be advantageous in the case of linear contact (in the direction of the bands of the microstructured zone 110).

The microstructured zone 110 may be comprised on a timepiece component 10, in particular a sliding and pivoting timepiece component, for example against another, fixed or moving timepiece component.

For example, the microstructured zone 110 may be comprised on a pivoting or bearing jewel, an escapement pallet, an impulse pin, a tooth, or other functional or decorative parts.

REFERENCE SIGNS USED IN THE FIGURES

10 Component
100 Contact surface
110 Microstructured zone
111 First microstructured zone
112 Second microstructured zone
120 Lubricated portion
20 Microcavities
30 Micropillars
40 Undulating microstructure
$\theta_{CA}$ Contact angle during advancement
L Lateral dimension
H Height

The invention claimed is:

1. A micromechanical component intended for timepiece mechanisms, at least a part of the component being made from a crystalline mineral material based on carbon or alumina comprising at least one contact surface intended to come into sliding and/or pivoting contact;

the contact surface comprising at least one microstructured zone having a texture;

the texture being formed of microcavities that make the microstructured zone more oleophobic than a non-microstructured zone of the contact surface, and/or formed of micropillars that make the microstructured zone more oleophilic than a non-microstructured contact surface;

wherein the microstructured zone is configured to confine a lubricating substance on a lubricated portion of the contact surface;

the texture being formed of microcavities and the microstructured zone extending at a periphery of the lubricated portion; or the microstructured zone comprising a first microstructured zone having a texture formed of microcavities and extending at the periphery of the lubricated portion, and a second microstructured zone having a texture formed of micropillars and extending in the lubricated portion;

wherein the lateral dimension of the microcavities and of the micropillars is between 5 μm and 150 μm.

2. The component as claimed in claim 1, wherein the material comprises ruby, sapphire or diamond.

3. The component as claimed in claim 1, wherein an undulating microstructure is superimposed on the texture formed of micropillars.

4. The component as claimed in claim 3, wherein the undulating microstructure is made up of parallel furrows with a width of between 7 μm and 12 μm and with a depth of less than 1 μm.

5. The component as claimed in claim 1, wherein the microstructured zone comprises a film of a substance for modifying the surface energy of the microstructured zone.

6. The component as claimed in claim 5, wherein the microstructured zone comprises a film of epilame.

7. The component as claimed in claim 1, wherein the lateral dimension of the microcavities and of the micropillars is between 10 μm and 60 μm.

8. The component as claimed in claim 1, wherein the ratio of the height to the lateral dimension of the microcavities and of the micropillars is between 0.01 and 1.

9. The component as claimed in claim 4, wherein the depth is between 0.2 μm and 0.9 μm.

10. The component as claimed in claim 1, wherein the density of the microcavities or of the micropillars in the microstructured zone is between 0.1 and 0.9.

11. The component as claimed in claim 1, wherein the density of the microcavities or of the micropillars in the microstructured zone is between 0.4 and 0.8.

12. The component as claimed in claim 1, comprising at least one of: a pivoting or bearing jewel, an escapement pallet, or an impulse pin, or a tooth.

* * * * *